Figure 5:
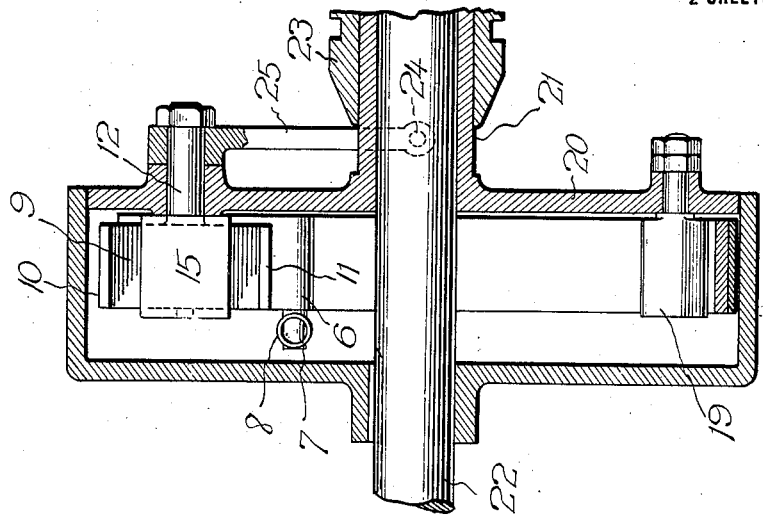

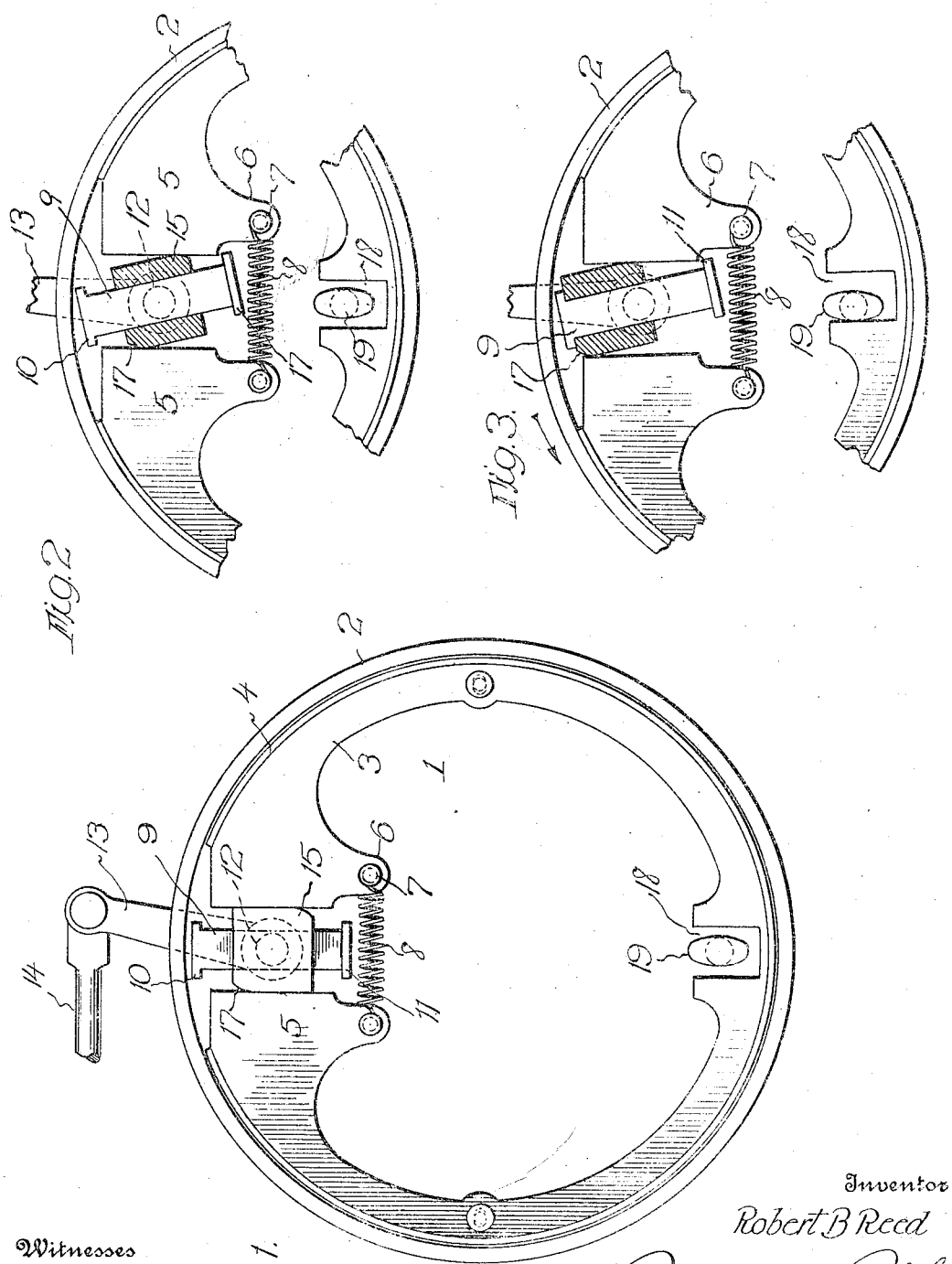

R. B. REED.
BRAKE CLUTCH.
APPLICATION FILED DEC. 26, 1913.

1,205,019.

Patented Nov. 14, 1916.
2 SHEETS—SHEET 2.

Witnesses
E. R. Barrett
A. M. Dorr

Inventor
Robert B. Reed
By
Attorneys

UNITED STATES PATENT OFFICE.

ROBERT B. REED, OF BENTON HARBOR, MICHIGAN.

BRAKE-CLUTCH.

1,205,019.  Specification of Letters Patent.  Patented Nov. 14, 1916.

Application filed December 26, 1913. Serial No. 808,705.

*To all whom it may concern:*

Be it known that I, ROBERT B. REED, a citizen of the United States of America, residing at Benton Harbor, in the county of Berrien and State of Michigan, have invented certain new and useful Improvements in Brake-Clutches, of which the following is a specification, reference being had therein to the accompanying drawings.

This invention relates to brake clutches, that can be advantageously used in connection with motor driven vehicles or in connection with various kinds of machinery where it is desired to retard and eventually stop a movable or driven body relatively to a stationary body.

My invention has particular reference to that type of brake clutch wherein expansible shoes are arranged in a drum for contacting with the walls thereof to retard a movement of the drum in either direction.

The primary object of my invention is to interpose positive and reliable means between said shoes for shifting the same into engagement with the drum, whereby the frictional force seeking to retard the drum is transferred to the means interposed between the shoes, where it will aid in retaining the brake shoes expanded and the brake applied.

Another object of this invention is to provide a brake shoe actuating device that can be easily and quickly adjusted whereby the frictional retardation of a drum can be set to require a maximum or minimum operating power to apply the brake shoes.

With the above and other objects in view, the invention resides in the novel construction, combination and arrangement of parts to be hereinafter specifically described and then claimed, and reference will now be had to the drawing, wherein—

Figure 4:
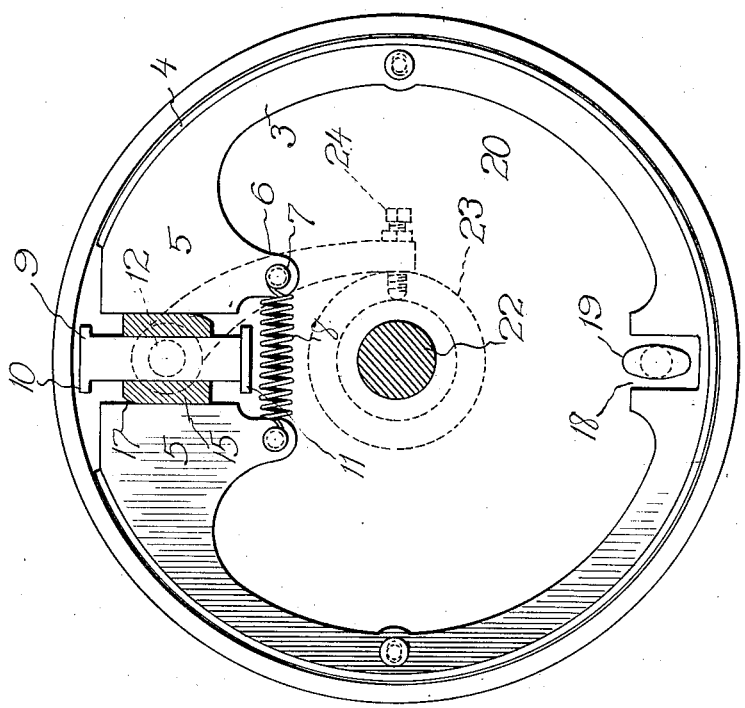

Figure 1 is an elevation of the brake clutch showing the brake shoe in a retracted position; Fig. 2 is a similar view, partly broken away, showing the brake shoe applied; Fig. 3 is a similar view showing the shoe actuating member in adjusted position, and Figs. 4 and 5 illustrate in elevation and section a modified form of operating mechanism.

In describing my invention by aid of the drawings above referred to, I desire to point out that I intend said views as merely illustrative of an example whereby my invention may be applied in practice, and I do not limit my claims to the precise arrangement and construction of parts indicated. The following description is therefore to be construed broadly as including substitute arrangements and constructions which are the obvious equivalent of those shown.

In the drawings, 1 denotes a revoluble drum having a flange 2 adapted to have the inner wall thereof engaged by one or more shoes, which in the present instance has been illustrated as a single slit shoe 3 having a wear plate or lining 4. The shoe 3 is circular in elevation and the split ends thereof are provided with enlargements 5 having inwardly projecting apertured lugs 6 which are connected, as at 7 to the end convolutions of a coiled retractile spring 8. The spring 8 is adapted to retain the shoe in a retracted position out of engagement with the flange 2 of the drum 1.

Arranged between the enlargements 5 of the brake shoe is a cross head 9 having one end thereof flanged, as at 10 and the opposite end thereof provided with a detachable cap 11. The cross head 9 is carried by the inner end of a rock shaft 12 and the outer end of said shaft has a crank 13 connected to an operating rod 14. By reciprocating the rod 14 the cross head 9 can be rocked in a desired direction.

The detachable cap 11 permits of an expander or cam 15 being placed upon said cross head. The outer side of said cam is slotted to provide clearance for the rock shaft 12, whereby said cam can be freely shifted longitudinally of the cross head. The spring 8 holds the enlargements 5 of the shoe normally in engagement with the cam and said cam has rounded edges or cam surfaces 17 that are brought into engagement with the confronting faces of the enlargements 5 when the shaft 12 is rocked.

The brake shoe 3, diametrically opposite the split thereof, is provided with a recess or cut-away portion 18 and extending into the recess or cut-away portion is an adjustable stop 19. By the walls of the recess or cut-away portion 18 contacting with the stop the brake shoe is limited in its movement and by turning or adjusting the stop, the action of the brake shoe relatively to the flange of the drum can be regulated.

As illustrated in Fig. 5, the rock shaft 12 and the adjustable stop 19 are carried by a circular head 20 extending into the drum, said head having a hub 21 that surrounds the shaft 22 upon which the drum is mounted. Slidable upon the hub 21 is a collar 23 adapted to engage a set screw 24 carried by a crank 25 mounted upon the outer end of the rock shaft 12. By shifting the collar 23 into engagement with the crank 25 the shaft 12 can be rocked to turn the cam 15 and apply the brake shoe to the drum. The collar 23 and the crank 25 constitute means that can be used in lieu of the crank 13 and the rod 14 for imparting movement to the rock shaft 12.

In operation, the cam 15 is placed in engagement with the confronting enlargements 5 of the shoe by a movement of the brake lever and immediately upon said shoe contacting with the drum frame, the torque or tendency of the shoe to rotate causes the cam to be shifted toward the extreme end of the cross head. The initial sliding movement of the cam decreases the pressure or power required to move the operating lever and maintain it in position and as the cam reaches a point intermediate the ends of the cross head, the pressure or power becomes neutral or normal and having passed the center of the cross head there is again a decrease in the power required to maintain the operating lever and the cross head in the adjusted position. The very fact that the brake shoe is arranged for rotative continuity with the drum flange 2 causes the cam to be maintained at the extreme end of the cross head and consequently there is a constant tendency of the brake shoe to expand. This is accomplished by one end of the brake shoe exerting a greater pressure upon the cam than the opposite end, due to the rotation of the drum flange. It is therefore apparent that under certain conditions the motion of the drum flange tends to set the brake shoe after the cam has been properly positioned while in other instances, it tends to decrease the pressure or power required for setting the brakes.

What I claim is:—

1. In a brake clutch, a drum, brake shoes adapted for engagement with said drum, and means between ends of said shoes adapted for automatic adjustment by a movement of said drum to a point where the torque required to produce a constant retardation or braking force is decreased.

2. In a brake clutch, a drum, brake shoes adapted for engagement with said drum, and means between ends of said shoes adapted for automatic adjustment by a movement of said drum through the medium of said shoes to a point where the torque required to produce a braking force is decreased.

In testimony whereof I affix my signature in presence of two witnesses.

ROBERT B. REED.

Witnesses:
W. P. HARVEY,
BLENDA A. SEABURG.